United States Patent [19]
van der Kolk et al.

[11] Patent Number: 4,888,056
[45] Date of Patent: Dec. 19, 1989

[54] SHOP PRIMER COMPOSITIONS

[75] Inventors: Cornelis E. M. van der Kolk, Heemskerk; Hendrik Van der Poel, Amstelveen, both of Netherlands; Jozef Braeken, Denderleeuw, Belgium

[73] Assignee: Labofina, S.A., Feluy, Belgium

[21] Appl. No.: 156,261

[22] Filed: Feb. 16, 1988

[30] Foreign Application Priority Data

Feb. 13, 1987 [WO] PCT Int'l Appl. .................. PCT/BE87/00001

[51] Int. Cl.⁴ ............................................... C09D 5/10
[52] U.S. Cl. .................. 106/1.17; 106/14.21; 106/287.1; 252/512; 252/519
[58] Field of Search ................. 106/1.17, 14.21, 287.1; 252/519, 512, 513

[56] References Cited

U.S. PATENT DOCUMENTS

| | | | |
|---|---|---|---|
| 3,505,262 | 4/1970 | Freyhold et al. | 524/442 |
| 3,884,705 | 5/1975 | Blair | 106/1.17 |
| 3,888,575 | 6/1975 | Fujii et al. | |
| 4,011,088 | 3/1977 | Makishima et al. | |
| 4,014,703 | 3/1977 | Hayati et al. | |
| 4,086,096 | 4/1978 | McLeod | |

FOREIGN PATENT DOCUMENTS

| | | |
|---|---|---|
| 0064344 | 11/1982 | European Pat. Off. |
| 246566 | 11/1987 | European Pat. Off. |
| 1669181 | 3/1968 | Fed. Rep. of Germany |
| 1459574 | 12/1976 | United Kingdom |

OTHER PUBLICATIONS

"The Use of Ethyl Silicate in Zinc Rich Paints", James R. Steinmetz, et al., pp. 138–143.
"Zinc Rich Coatings Technology", D. M. Berger, pp. 46–52.
"Economics of Zinc Coatings", D. M. Berger, pp. 59–61.
"Alkali Silicates in Surface Coatings", A. Pass, et al., pp. 54–88.
"Single-Package Zinc-Rich Coatings", T. Ginsberg, pp. 138–143.

Primary Examiner—Paul Lieberman
Assistant Examiner—Christine A. Skane
Attorney, Agent, or Firm—Michael J. Caddell; John K. Abokhair; M. Norwood Cheairs

[57] ABSTRACT

Shop primer compositions having improved properties comprise (a) fillers and pigments, at least 25 wt. % of which have conductive properties; (b) zinc powder in a weight ratio to fillers and pigments between 1:16 and 1:1; wherein the zinc, fillers and pigments are milled to a sufficient fineness; (c) anti-settling agents; (d) optionally, thickening agents; (e) a silicate-type binder, in an amount such that the weight ratio of the $SiO_2$ content of the binder to the zinc, fillers and pigments is between 1:4 and 1:16; and (f) solvents.

When using the shop primer compositions of the present invention, the welding properties are improved and the health hazards during welding are reduced, without having to remove the primer layer at the welding area. The primer coatings are compatible with the welding techniques generally used in the heavy steel construction industry, including MIG/MAG welding in 3F position.

6 Claims, No Drawings

SHOP PRIMER COMPOSITIONS

BACKGROUND OF THE INVENTION

The present invention relates to an improved composition for application as a shop primer in the steel industry. More particularly, the present invention relates to a shop primer composition used for coatings that do not interfere with welding operations or give off toxic fumes during these operations.

When bare steel is used for construction purposes, blasting and primer coating have to be carried out in situ, thereby involving higher costs. Therefore, rolled steel is now generally blasted using automatic procedures and immediately coated with a thin shop primer coating prior to being used.

The requirements for shop primers are multiple:
they should be easily sprayable;
they should dry fairly rapidly;
they should provide a good, although temporary, protection against corrosion;
they should provide a primer layer that has good mechanical resistance;
they should provide a primer coating that does not impair weldability;
they should not pose any health hazards during welding;
they should provide a primer coating that is compatible with the further protectons used.

The most common types of welding techniques in the heavy steel construction industry are based on the generation of an electric arc between an electrode and the workpiece, the difference residing in the method used for protecting the weldpool against oxidation. The most important welding techniques include:

1. Manual Metal Arc welding (also called Shielded Metal Arc or Rod welding), wherein the molten seam is protected by the melting of the flux provided around the rod. This welding technique is mainly used in a manual way, although automated horizontal rod welding (also called gravity welding) is known and used. Manual rod welding can be used in all welding positions, but with low welding speed. After welding, the flux remains as slag on top of the weldseam, and it must be removed before any coating operation.

2. Submerged Arc welding (also called under powder welding): this technique is automatic and allows high welding speed, but obviously only for horizontal welds. The powder partially melts and remains on top of the weldseam; the rest is sucked away.

3. MIG/MAG welding (Metal Inert Gas/Metal Active Gas welding), wherein a flow of gas is provided around the electrode core to protect the molten seam. In the case of MIG welding, the gas used is pure argon (or another inert gas). In the case of MAG welding, the gas can be a combination of argon (or another inert gas) with carbon dioxide (sometimes in combination with oxygen). MIG/MAG welding is often preferred because it can be used with automatic welding machines in horizontal welding positions, resulting in higher welding speeds than with other welding techniques. Further, manual MIG/MAG welding with automatic electrode feeding (usually called semi-automatic welding) is also possible; in such case, the welding speed can also be higher than with other manual welding techniques. Still a further advantage of MIG/MAG welding is that the heat-affected zones are smaller than with other electric arc welding methods.

When welding a T-joint, two seams are to be formed on either side. However, when using MIG/MAG welding, the seam solidifies more rapidly. Thus, when the second seam is formed, any gas formed through the combustion of the primer can no longer escape between the parts to be welded. The gas formed is, therefore, likely to cause pore formation in the seam.

It is known to use shop primers based on organic binders, most frequently based on epoxy resins or on polyvinyl butyral reinforced phenolic resins. However, these binders form gases during the welding process, thereby resulting in severe internal (i.e. non visible from the outside) and external porosity of the weldseam. Also, the primer coating alongside the weldseam and on the reverse side is overheated during welding, forming what are called "burn back" zones, and the subsequent paint coatings are likely to perform poorly on the overheated primer. The costly alternative is to remove these primers (i) from the welding area before welding, and also (ii) from the reverse side, preferably before welding else after the welding procedure but prior to application of subsequent coatings. The additional cost of removing the primer, however, reduces the advantage resulting from high welding speed.

It is also known to use shop primers based on inorganic binders, such as silicates. These primers contain a large proportion of zinc to ensure the anticorrosive properties, however, zinc presents important health risks during the welding operations. Further, MIG/MAG welding of steel covered with zinc primers having a high zinc content results in severe spattering during the welding operations. When making vertical weldings, this spattering interferes extensively with the welding process, particularly because the spatters accumulate on the electrode, resulting in short-circuiting and uncontrolability of the weldpool. Since vertical MIG/MAG welding practically has to be carried out semi-automatically, the spattering also creates unacceptable working conditions for the operator.

There is accordingly a need in the art for an improved shop primer composition which would allow good weldability in all positions with low spattering, and reduced health risks without requiring prior removal of the primer coating from the welding area. This need particularly exists when using high speed welding techniques such as in the shipbuilding industry, where welding costs represent as much as one fourth of the building costs.

OBJECT OF THE INVENTION

It is an object of the present invention to provide an improved shop primer composition that provides good anti-corrosion properties and good weldability.

Another object of the present invention is to provide a shop primer composition which presents acceptable health risks during welding operations.

A further object of the present invention is to provide a shop primer composition which allows welding without previous blasting or grinding of the welding area.

Still another object of the present invention is to provide a shop primer coating that is not distroyed on the reverse side of the substrate being welded.

It is yet a further object of the present invention to provide a shop primer that does not cause weld spatters to adhere to the coated workpiece.

DESCRIPTION OF THE INVENTION

The improved shop primer composition of the present invention comprises:

(a) fillers and/or pigments, at least 25 wt. % of which have conductive properties;

(b) finely divided zinc such as zinc powder or zinc dust, in a weight ratio of between 1:6 to 1:1 to the total amount of fillers and/or pigments; said zinc, fillers and pigments being milled to a sufficient fineness;

(c) one or more anti-settling agent;

(d) optionally, one or more thickening agent;

(e) a silicate-type binder, in an amount such that the weight ratio of the $SiO_2$ content of said binder to the total amount of zinc, fillers and pigments is between 1:4 and 1:16; and (f) one or more solvent.

The Applicants have found that coatings, using the shop primer compositions of the present invention, are compatible with automatic welding techniques in all positions as well as with the other manual welding techniques commonly used in the steel construction industry.

In addition, the applicants have unexpectedly found that the shop primer composition prepared in accordance with the present invention, having a zinc content reduced down to about 10 wt. % (based on the total weight of the composition excluding solvents) has adequate anti-corrosion properties. This reduced amount of zinc is still effective due to the addition of at least one conductive pigment/filler additive, at least 25 wt. % thereof having conductive properties.

The binder used in the shop primer compositions of the present invention is of the silicate type. Such binders are known in the art, and include the solvent-based alkylsilicate types (with or without terminal silanol groups) and the water-based silicate types. The alkylsilicate-type binders are more preferred due to their improved application and recoatability properties.

The alkylsilicate-type binders are produced by high molecular weight condensation of tetraalkylsilicate monomers. Numerous references can be found in the art, including (1) U.S. Pat. No. 3,056,684, (2) "The use of ethyl silicate", J. R. Steinmetz, Modern Paint and Coatings, June 1983, and (3) "Filmbildung in anorganischen Zinkstaub-Anstrichen", E. V. Schmid, Farb und Lack, Vol. 84,1978.

Alkylsilicate-type binders can also be produced as a high molecular weight condensate of tetraalkylsilicate monomers without a silanol group at the condensate chain end. Disclosures, in the art of these types of binders include (1) "Single Package Zinc-Rich Coating", T. Ginsberg and L. G. Kaufman, Modern Paint and Coating, October 1981, and (2) "Zinc-Rich Coating Technology" D. M. Berger, G. Associated Ltd., Metal Finishing, March 1975.

Water-based silicate type binders are usually alkali silicates. These alkali silicates are also known in the art, as e.g. in German Patent No. 1,669,181 or in "Alkali Silicates in Surface Coatings" (A. Pass and M. J. F. Meason, in "Amalgamated Oxides").

Also known in the art are quaternary ammonium silicate solutions/dispersions in water. These are commercially available, e.g. from Emmery Industries Inc. (Quram Product Line data sheet, June 1980).

The shop primer compositions of the invention are generally prepared as two-component systems, such being more flexible and more economical although it can be envisioned to prepare a one-component system when the silicate binder is based upon an alkylsilicate condensate without a silanol group at the condensate chain end.

The present invention is mainly based upon the particular composition of a pigment/filler mixture, e.g. in the form of a paste, which is mixed in certain ratios with a suitable silicate binder, giving dry film properties as hereinabove described. While maintaining good overall properties, and in particular good anti-corrosion properties, the composition of this mixture is characterized by a low zinc content. The composition of the present invention will be detailed hereinafter in the particular embodiment wherein a two-component paint is prepared.

The silicate binder is the first component, generally dissolved in part of the solvent, and is preferably of the alkylsilicate type.

The second component is a paste containing fillers, pigments and anti-corrosive agents, together with thickening and anti-settling agents in a solvent mixture. All ingredients should preferably be water-free (max. 0.15 wt. % of water), especially when solvent-based silicate binders are used.

Although not wishing to be bound by theory, the paste components can be classified in different types according to their alleged functions.

Zinc powder, zinc dust or zinc flakes are used as an anti-corrosive agent, effective because of its galvanic action on the steel substrate.

The pigments or fillers are of several types. Conductive pigments/fillers are an essential part of the composition: they improve both the anti-corrosive properties (by electrically connecting zinc particles with the substrate) and the arc welding properties. Examples of pigments/fillers known to have conductive properties include di-iron phosphide, micaceous iron oxide (derived from natural or synthetic sources), copper flakes, nickel flakes, stainless steel flakes, aluminum flakes dry or as an aluminum flake paste. The micaceous iron oxide types are preferred, resulting in optimal welding and anti-corrosive properties of the present invention.

A minor amount of the pigments/fillers used in the composition of the present invention can be the type of material that interacts with the steel substrate resulting, for example, in some inhibition or passivation of the substrate. This interaction is assumed to slow the consumption of the galvanically active pigment. Examples of pigments/fillers having such properties include chromates like zinc chromate or zinc potassium chromate, phosphates like calcium diphosphate, zinc phosphate, potassium phosphate, sodium potassium polyphosphate or aluminum polyphosphate, or borates like zinc metaborate or barium metaborate and zinc oxide.

Pigments or fillers believed to be inactive are optional in the present invention, although for many reasons their inclusion into the composition is desirable, whether for economic reasons, or to provide a primer with a suitable and/or desired color, or even for improving the coating process (regarding e.g. film-forming, drying or anti-mudcracking properties). Examples of the numerous possible inactive pigments/fillers include, aluminum silicates, MgAl silicates, barium sulfate, calcium carbonate, titanium dioxide, red iron oxides, yellow iron oxides, chromium oxides and manganese dioxide.

Thickening agents can also be used, but are not essential to the present invention. Any thickening agent can be used, but preferred examples include polyvinyl butyral, melamine formaldehyde, acrylate polymers, nitrocellulose or hydroxyethylcellulose polymers, the latter being preferred. When used, a thickening agent is added in avery small amount, typically up to about 1 wt. % relative to the second component.

The anti-settling agent used in the present invention can be any effective anti-settling additive such as clay-type materials, glycerol trihydroxystearate, polyethylene wax, polyamide-type materials, or mixtures thereof. The amount of anti-settling agent used will depend upon the type of anti-settling agent, and those skilled in the art know that this amount should not be excessive since a large amount might impart excessive thixotropic properties to the paste. Preferred anti-settling agents are those of the clay type, which are typically added in amounts of from 0.2 to 4 wt. % relative to the second component, preferably of from 0.5 to 1.5 wt. %.

The solvent for the second component is generally a solvent mixture comprising at least one of the solvents suitable for the first component, and optionally one or several other, less polar, solvents. Examples of such less polar solvents include toluene and xylene. The amount of solvent used will be adjusted by those skilled in the art depending upon the composition of the second component. For practical reasons, it is preferred that the amount of solvents used in both components be such that, when mixed in the desired ratio, a shop primer composition is obtained ready for application. It is further preferred that the composition be adjusted so that the components should be mixed in approximately equal amounts by weight.

The amount of fillers/pigments and anti-corrosive agents in the second component should be such that, after mixing with the first component, the weight ratio of the total fillers, pigments and anti-corrosive agents, including any mineral-type anti-settling agent, to $SiO_2$ content of the silicate binder is between 4:1 and 16:1, preferably of about 8:1.

In addition, the weight ratio of the anti-corrosive agents to the total fillers and pigments, including any mineral-type anti-settling agent, should be between 1:6 and 1:1, preferably between 1:6 and 2:5.

Further, the conductive fillers/pigments should represent at least 25 wt. % of the total amount of fillers/pigments.

The hereinabove mentioned ratios correspond to a weight ratio of zinc to the total of zinc, fillers, pigments and $SiO_2$ 4:35 to 16:34, preferably 8:63 to 20:63.

It has further been observed that, within the above ranges, the welding properties are improved when the weight ratio zinc:zinc+fillers+pigments +$SiO_2$ does not exceed 20:63.

The method for preparing the second component is essential for the present invention. In order to obtain minimal spattering during welding and improved anti-corrosive properties, the zinc dust, zinc powder or zinc flakes must be thoroughly grinded, with (depending on their grain size) the conductive pigments and/or residual fillers and/or pigments. It is preferred that the resulting grain size of this ground mixture be no larger than about 0.045 mm.

It is believed that the reduction in spattering is obtained at least in part by the fact that thorough grinding will prevent agglomerates of zinc dust, zinc powder or zinc flakes to be present in the dried paint film. Ruling out the zinc concentration, zinc particle agglomerates are thought to be the main cause of spattering during welding.

The improved anti-corrosive properties are believed to be obtained due to the more effective contact between the dispersed zinc particles and conductive pigments. Improved electrical contact between zinc particles, conductive pigment and the ferrous substrate upon which the paint is applied, should lead to optimal usage of the galvanic properties of the zinc particles.

In addition, when coarse micaceous iron oxide grades or other coarse conductive pigments are used (fineness above 45 micrometer), thorough grinding is essential to obtain pastes with sufficient fineness. This is necessary to avoid practical problems in case of spray application. Blocking of spray-unit nozzles and excessive wear of spray units are observed when using compositions that include coarse hard pigments.

Examples of grinding methods are ball milling, and horizontal or vertical grinding with beads, pearls or sand. For practical reasons, a preferred method uses ball milling during about 24 hours with ceramic balls. It is also possible to use high speed dissolving, but the resulting fineness is usually insufficient. The anti-settling agent is preferably added shortly after milling.

According to one embodiment of the present invention, the shop primer is prepared as a one-component shop primer (paint). The binder of a one-component shop primer according to the present invention must be a high molecular weight condensate of a tetraalkylsilicate without a terminal silanol group, the alkyl groups being preferably ethyl or propyl groups. The fillers and pigments, and the anti-corrosive and anti-settling agents to be used are as described hereinabove, and in the same weight ratios to the binder.

The welding properties obtained with one or two-component shop primers are very similar. A small increase in the corrosion resistance is observed with the one-component paint, but this is not sufficient to counterbalance the practical (mostly economical) advantage of two-component paints.

The invention will not be described by reference to the following examples which are intended to be illustrative and are not intended to limit the reasonable scope of the present invention.

EXAMPLE 1 a. Preparation of the first component

In a stainless steel tank, the following ingredients were introduced at room temperature, while mixing:
6 parts by weight (pbw) of isopropyl alcohol;
19.9 pbw prehydrolyzed tetraethyl silicate polymer, having a $SiO_2$ content of 40 wt. %;
15.1 pbw 1.1 wt. % solution of sulfuric acid in a water to 2-methyoxypropanol [water to methy-oxy propanol] mixture (1:4 weight ratio).

The mixture was stirred during two hours, the temperature slowly increasing to a maximum of 35° C. After cooling, there were incorporated a further 57.2 pbw isopropyl alcohol, and 1.8 pbw trimethyl borate.

The first component was stored in appropriate plastic cans.

b. Preparation of the second component

In a dry tank, the following ingredients were added in the order indicated, and mixed to homogeneity:
19.5 pbw xylene,
0.3 pbw hydroxyethyl cellulose,
17.0 pbw aluminium silicate powder,
7.2 pbw yellow iron oxide powder, 17.8 pbw zinc dust,
22.2 pbw micaceous iron oxide powder,
4.0 pbw of an aluminium paste containing 65 wt. % aluminium flakes in white spirit,
1.6 pbw 2-meth oxy propanol, and
4.9 pbw isopropyl alcohol.

The homogeneous mixture was ball milled during hours using ceramic balls. The fineness of the resulting mixture was measured to be about 0.040 to 0.045 mm. The ball mill was rinsed with 4.7 pbw 2-methoxy propanol and isopropyl alcohol. Then 0.8 pbw of bentonite were added before storing the second component in metal cans.

c. Preparation and application of the shop primer

The two components were mixed in a 1:1 weight ratio. The shop primer was applied with an air spray, so as to form a 0.025 mm thick layer after drying.

d. Evaluation of the porosity obtained when welding over the shop primer layer

The specifications DVS-0501 (Deutsche Verband fur Schweisstechniek, Postfach 2726, Aachenerstrasse 172, D-4000 Dusseldorf) were followed throughout, except as mentioned hereunder.

The metal welding was carried out under a gas mixture containing 80% argon and 20% carbon dioxide, with automatic feeding of the electrode. The electrodes used were 1.2 mm diameter CORE WELD 70 Ni metal filled electrodes. The welding conditions were as follows:

welding speed: 30 cm/min.
gas flow: 15 l/min.
continuous current: 30 V, 200 A
weldseam thickness: 4 mm After welding, the external porosity was examined visually. The weld was then broken, while brought to a temperature of about 200° C., to examine the internal porosity.

For comparative purposes, the same evaluation tests were carried out with two commercial shop primers, also based on alkyl silicates but containing as much as about 70 wt. % of zinc in the dry film. These commercial primers will be designates as A and B.

The visual examination of the external porosity over a length of 10 cm of the weldseam showed 4 holes with the primer of the present invention, 5 holes with primer A and 6 holes with Primer B.

The results of the internal porosity determination were as follows:

invention: 24 holes/10 cm; total section area: 5.6 mm$^2$
primer A: 55 holes/10 cm; total section area: 13.1 mm$^2$
primer B: 47 holes/10 cm; total section area: 10.8 mm$^2$

EXAMPLE 2 a. Preparation of the first component:
see Example 1 b. Preparation of the second component.

The composition used was identical to the second composition described in Example 1, however the inactive fillers were not included in the ball mill procedure because they already had a sufficiently fine grain size. This resulted in a more efficient and economical manufacturing procedure without noticeable influence on welding and anti-corrosive properties.

In a dry tank, the following ingredients were added in the order indicated and mixed to homogeneity:
19.5 pbw xylene,
0.3 pbw hydroxyethylcellulose
22.2 pbw micaceous iron oxide powder (coarse grade)
17.8 pbw zinc dust,
4.0 pbw aluminium paste containing 65 wt. % aluminium flakes in white spirit.

The homogeneous mixture was ball milled during hours, using ceramic balls. The fineness of the resulting mixture was measured to be about 0.040 to 0.045 mm. The ball mill was rinsed with 4.7 pbw 2-methoxypropanol and isopropyl alcohol. The raw materials not requiring ball milling were added together with the bentonite and dispersed to fineness with a high speed dissolver.

17.0 pbw aluminium silicate powder
7.2 pbw yellow iron oxide powder
0.8 pbw bentonite
1.6 pbw 2-methoxy-propanol
4.9 pbw isopropyl alcohol c. Preparation and application of shop primer
see Example 1 item c

EXAMPLE 3 a. Preparation of the first component
see Example 1.

b. Preparation of the second component.

The composition used was identical to the second composition described in Example 2, however the inactive filler (aluminium silicate powder) was replaced by the active filler zinc oxide. This replacement resulted in improved anti-corrosive properties with respect to Examples 1 and 2, without noticeable influence on weldability.

In a dry tank the following ingredients were added in the order indicated and mixed to homogeneity:
19.5 pbw xylene
0.3 pbw hydroxyethylcellulose
17.8 pbw zinc dust
22.2 pbw micaceous iron oxide powder (coarse grade)
4.0 pbw aluminium paste containing 65 wt. % aluminium flakes in white spirit
3.0 pbw isopropyl alcohol The homogeneous mixture was ball milled during hours using ceramic balls. The fineness of the resulting mixture was measured to be about 0.040 to
14.0 pbw zinc oxide (lead free grade)
3.0 pbw aluminium silicate powder
7.2 pbw yellow iron oxide powder
0.8 pbw bentonite
1.6 pbw 2-methoxy propanol
1.9 pbw c. Preparation and application of shop primer.
See Example 1.

EXAMPLE 4 a. Preparation of first component.
See Example 1 b. Preparation of second component.

The composition was identical to the second composition described in Example 2, however 6.1 pbw inactive filler aluminium silicate powder was replaced by barium metaborate commercially available as Butrol 11 M1 supplied by Buckman Laboratories S.A. This replacement resulted in improved anti-corrosive properties with respect to Examples 1 and 2, however having slight adverse effects on weldability. c. Preparation and application of shop primer.

See Example 1.

EXAMPLE 5 a. Preparation of first component.
   See Example 1.
b. Preparation of second component.
   The composition used was identical to the second composition described in Example 2. However 15.7 pbw of the inactive filler aluminium silicate powder was replaced by aluminium polyphosphate commercially available as K-white 84 supplied by Teikoku Kako Co Ltd. This replacement resulted in slightly improved anti-corrosive properties with respect to Examples 1 and 2, however having no noticeable effects on weldability.
c. Preparation and application of shop primer.
   See Example 1.

EXAMPLE 6 a. Preparation of first component.
   See Example 1.
b. Preparation of second component.
   The composition used was identical to the second composition described in Example 2, however instead of zinc dust, zinc flakes commercially available as zinc powder ECKA NP 31129/G supplied by Eckhart-Werke were used. This replacement resulted in slightly improved anti-corrosive properties with respect to Examples 1 and 2, however having no noticeable effects on weldability.
c. Preparation and application of shop primer.
   See Example 1.

EXAMPLE 7 a. Preparation of first component.
   See Example 1.
b. Preparation of second component.
   The composition used was identical to the second composition described in Example 2, however instead of coarse micaceous iron oxide powder derived from natural sources, synthetic micaceous iron oxide powder of a fine grade (average fineness <0.030 mm), commercially available as Laminox F supplied by MPLC Laboratories Limited was used.
   Due to the fine grade, there was no need anymore to ball mill the micaceous iron oxide together with the zinc particles, and it was added after the ball mill procedure together with the inactive or active fillers and pigments.
c. Preparation and application of shop primer.
   See Example 1.

a. Preparation of first component.
   See Example 1.
b. Preparation of second component.
   In this composition the amount of zinc was increased. In addition, the active filler zinc oxide was used instead of the inactive aluminium silicate powder. The composition was formulated to obtain long time anti-corrosive properties at reduced dry film thickness.
   In a dry tank the following ingredients were added in the order indicated and mixed to homogeneity:
   19.5 pbw xylene
   0.3 pbw hydroxyethyl cellulose
   32.7 pbw zinc dust
   20.5 pbw micaceous iron oxide powder (coarse grade)
   4.0 pbw aluminium paste containing 65 wt. % of aluminium flakes in white spirit
   2.3 pbw isopropyl alcohol The homogeneous mixture was ball milled during hours using ceramic balls. The fineness of the resulting mixture was measured to be about 0.040 to 0.045 mm. The ball mill was rinsed with 4.4 pbw -methoxy propanol and isopropanol. The raw materials not essential to be ball milled were added together with the bentonite and dispersed to fineness with a high speed dissolver:
   6.7 pbw zinc oxide (lead free grade)
   7.2 pbw yellow iron oxide powder
   0.8 pbw bentonite
   1.6 pbw
c. Preparation and application of shop primer
   See Example 1, however the applied dry film thickness was 0.015 mm.

EXAMPLE 9 (comparative)

a. Preparation of first component.
   See Example 1.
b. Preparation of second component.
   The composition used was identical to the second composition described in Example 2, however the zinc dust was not ball milled but added together with inactive fillers and pigments. This Example is meant to be illustrative showing that milling the zinc dust, zinc powder or zinc flakes to a sufficient fineness is essential to obtain improved weldability and anti-corrosive properties.
c. Preparation and application of shop primer
   See Example 1

EXAMPLE 10

In a dry tank, the following ingredients were added in the order indicated and mixed to homogeneity:
   9.05 pbw xylene,
   1.15 pbw polyvinylbutyral
   6.9 pbw quartz powder,
   3.7 pbw yellow iron oxide powder,
   8.55 pbw zinc dust,
   4.45 pbw di-iron phosphide,
   0.8 pbw xylene, and
   5.2 pbw isopropyl alcohol.
   The homogeneous mixture was ball milled during 24 hours, using ceramic balls. The fineness of the resulting mixture was measured to be about 0.040 to After transferring to a tank, the mill was rinsed with 33.3 pbw toluene. This toluene was then transferred to the tank.
   The following ingredients were then added and mixed to homogeneity:
   0.5 pbw bentonite,
   15.7 pbw silicate binder, without terminal silanol group at the condensate chain end, containing 35wt. % pf $SiO_2$; and
   0.7 pbw triethanolamine.
   The resulting one-compound primer composition was stored in metal cans, ready for application (except for viscosity adjustments).
   The primer was applied on shotblasted steel panels, as per Example 1, item c.

EVALUATION OF THE MIG/MAG WELDING RESULTS OF EXAMPLES 1–10

Experimental

In each experiment two panels were put together to form a T-joint and welded on both faces, called the leading (first) side and the trailing (second) side. The MIG/MAG welding experiments were carried out for two positions, the 2F-position and the 3F-position. The welding in the horizontal 2F-position was carried out fully automatic. The torch was transported alongside the T-joint side by an apparatus known as "tracker". The welding in the vertical 3F-position was carried out downwards, manually (semi-automatic MIG/MAG welding).

-continued

| Welding current: | 200–220 A |
| --- | --- |
| Welding voltage: | 2.7 V |
| Wire type: | solid wire, SG2 (DIN 8555) diameter 1.0 mm |

TABLE 1

Results of MIG/MAG welding on the 2F-welding position

| Example No. | Arc Stability | Amount of Spattering (1) | Visual porosity | | Buried porosity | |
| --- | --- | --- | --- | --- | --- | --- |
| | | | Leading | Trailing (2) | Leading | Trailing (2) |
| 1 | good | 2 | none | none | none | <5% |
| 2 | good | 2 | none | none | none | <5% |
| 3 | good | 2 | none | none | none | <5% |
| 4 | reasonable | 5 | none | 3 pores | 10–15% | 15–20% |
| 5 | good | 2 | none | none | none | <5% |
| 6 | good | 2 | none | none | none | 5–10% |
| 7 | good | 2 | none | none | none | <5% |
| 8 | reasonable | 3 | none | none | none | 5% |
| 9 | unstable | 5 | none | none | none | 15–20% |
| 10 | good | 2 | none | none | none | <5% |

Remarks
(1) scale 0–10
0 means: amount of spattering as observed when MIG/MAG welding uncoated shotblasted steel under identical conditions
10 means: excessive spattering, no welding possible
(2) the percentage is the ratio:

$$\frac{\text{pore area}}{\text{total weldseam area}} \times 100$$

TABLE 2

Results of MIG/MAG welding in 3F-downwards position

| Example No. | Arc Stability | Amount of Spattering (1) | Visual porosity | | Buried porosity | |
| --- | --- | --- | --- | --- | --- | --- |
| | | | Leading | Trailing (2) | Leading | Trailing (2) |
| 1 | good | 2 | none | none | none | <5% |
| 2 | good | 2 | none | none | none | <5% |
| 3 | good | 2 | none | none | none | <5% |
| 4 | reasonable | 5 | none | 2 pores | 10–15% | 15–20% |
| 5 | good | 2 | none | none | none | <5% |
| 6 | good | 2 | none | none | none | <5% |
| 7 | good | 2 | none | none | none | <5% |
| 8 | reasonable | 3 | none | none | none | 5–10% |
| 9 | unstable | 7 | 1 pore | 5 pores | <5% | 15–20% |
| 10 | good | 2 | none | none | none | <5% |

Remarks:
(1) and (2) see table 1.

General Information

| MIG welding apparatus: | ESAB LAH 500 |
| --- | --- |
| wire unit: | ESAB A 10 MEC 44 |
| Shielding gas: | 80% Argon, 20% CO₂ (commercial name AGA mix 20, supplied by AGA gas - Holland) |
| Flow: | 15 l/min. |
| Welding plates: | shotblasted steel size 400 × 120 × 10 mm |

2F-position (see table 1)

| Welding speed: | 40–60 cm/min. |
| --- | --- |
| Welding current: | 280–320 A |
| Welding voltage: | 32 V |
| Wire type: | solid wire, SG2 (DIN 8555) diameter 1.2 mm |

3F-position - Downwards (see table 2)

| Welding speed: | 30–60 cm/min. |
| --- | --- |

Outdoor weathering test according to ASTM D 1104.

The test panels (150×150×10 mm) were shotblasted to an average roughness of 0.045 mm. The primer was applied on a dry film thickness per item 1.c of previous described examples. The coated panels were exposed outdoor at 45° facing south, according to ASTM D 1104, at location Uithoorn, the Netherlands. After 2 months exposure, the corrosion was estimated according to the rustscale disclosed on ASTM D 610 (see table 3).

TABLE 3 results of outdoor exposure according to ASTM D 1104 specification

| Example no. | Rust grade (ASTM D 610) |
| --- | --- |
| 1 | 7 |
| 2 | 7 |
| 3 | 9–10 |
| 4 | 8–9 |
| 5 | 8 |
| 6 | 7–8 |
| 7 | 6–7 |
| 8 | 9–10 |

TABLE 3-continued

| results of outdoor exposure according to ASTM D 1104 specification | |
|---|---|
| Example no. | Rust grade (ASTM D 610) |
| 9 | 2 |
| 10 | 7–8 |

The results in the above examples show that shop primer compositions prepared in accordance with the present invention display dramatically improved welding properties while maintaining good corrosion inhibition properties, despite low zinc content.

We claim:

1. A method for preparing a shop primer composition comprising and a
   (a) mixing in a vessel finely divided zinc conductive pigment/filler additive, at least 25 wt. % thereof having conductive properties, selected from the group consisting of conductive fillers, conductive pigments, non conductive fillers, non conductive pigments and mixtures thereof, in a weight ratio of zinc to pigment/filler between about 1:16 and 1:1; and
   (b) milling the mixture of (a) to a sufficient fineness to improve the anti-corrosive properties and lower the spattering properties of the shop primer composition;
   wherein the resulting composition also contains at least one anti-settling agent, at least one solvent, and a silicate binder in an amount such that the weight ratio of $SiO_2$ in said binder to the zinc and pigment/filler additive is between 1:4 and 1:16.

2. The process according to claim 1, wherein said silicate binder is dissolved in a portion of the solvent and combined with the composition after step (b).

3. The process according to claim 1, wherein step (b) produces a ground mixture with a grain size no larger than about 0.045 mm.

4. The process according to claim 1, wherein said process produces a one-component shop primer composition and said silicate binder is a high molecular weight condensate of a tetraalkylsilicate without a terminal silanol group.

5. The process according to claim 1, wherein step (b) comprises ball milling for about a day using ceramic balls.

6. The process according to claim 1, wherein said anti-settling agent is added shortly after milling step (b).

* * * * *